United States Patent Office 3,783,070
Patented Jan. 1, 1974

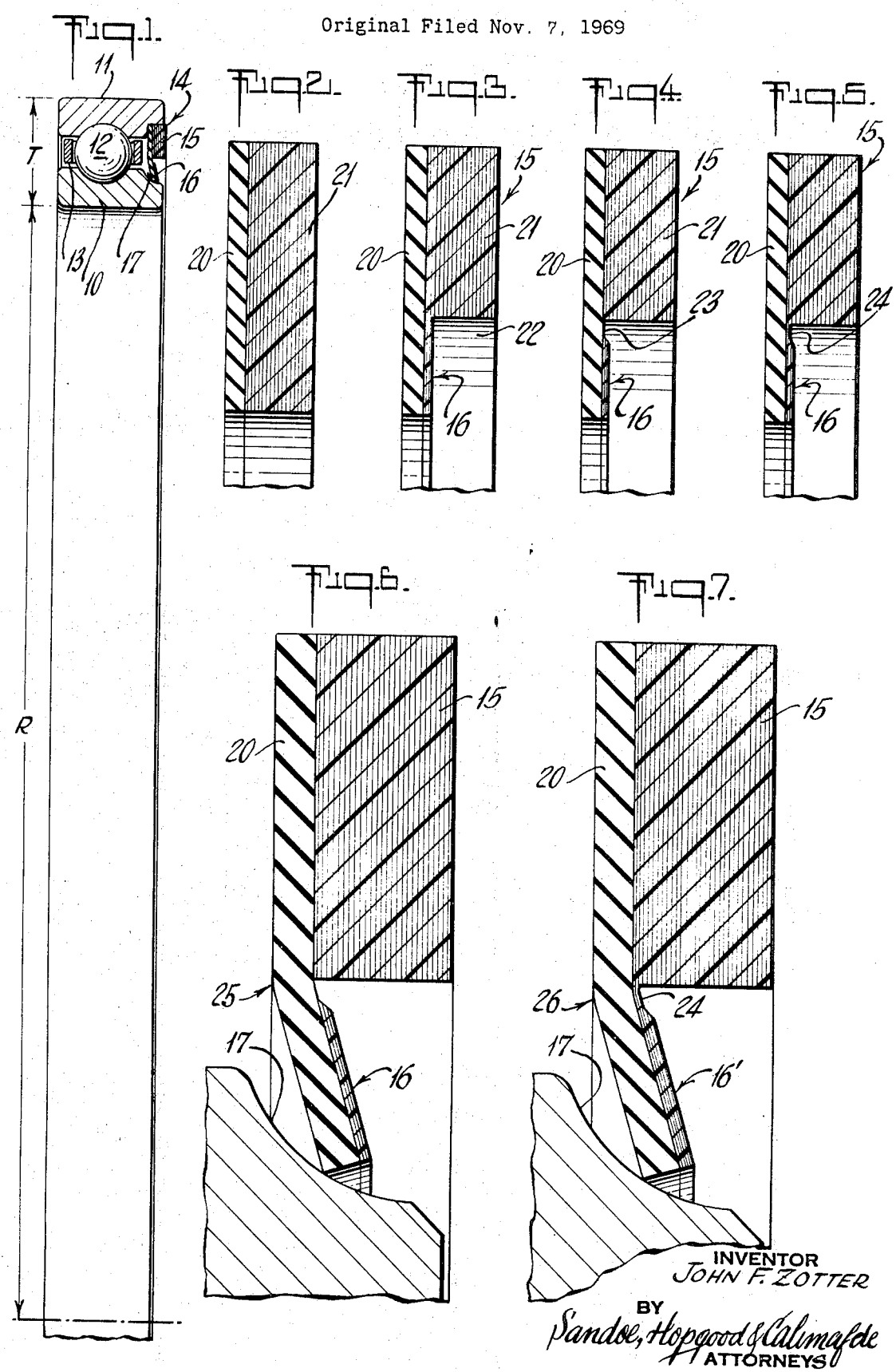

3,783,070
METHOD OF MAKING A BEARING SEAL
John F. Zotter, Southington, Conn., assignor to
Textron Inc., Providence, R.I.
Original application Nov. 7, 1969, Ser. No. 874,927, now
Patent No. 3,580,590. Divided and this application
Nov. 25, 1970, Ser. No. 92,704
Int. Cl. B31f *3/00;* B32b *31/00*
U.S. Cl. 156—211                                                     4 Claims

ABSTRACT OF THE DISCLOSURE

The invention contemplates a laminated seal construction and method utilizing a flat annular sheet of flexible material, such as elastomeric material, laminated to a backing material, which at an axially thick portion defines a body, and which at an axially thin portion defines a seal member to be axially resiliently deflected with respect to the body. The method of the invention calls for removing backing material after the laminating step, the removed material affording a remainder which meets all requirements as to concentricity, circumferential uniformity of action, and the like. The material-removing step may be so characterized as to provide a local region for axial flexure, radially spaced from the region of wiping contact with the bearing ring to which it is sealingly engaged.

---

This application is a division of my copending application, Ser. No. 874,927, filed Nov. 7, 1969, now United States Letters Pat. No. 3,580,590.

This invention relates to a seal construction, particularly suited to sealing an axial end of an antifriction bearing.

In bearings of the character indicated, it is a common practice to use the deflected flexible lip of resilient seal material to provide light, axially preloaded, wiping contact to develop the seal without affecting the rotary action of the bearing rings. Various stiffening structures have been provided to determine the axial preload on the seal action, and to assure desired shape of the lip of the seal, but so far as is known to me none of these prior structures or techniques is applicable to antifriction bearings in which the overall radial extent of the bearing elements (i.e., radial distance, from the bore of the inner ring, to the periphery of the outer ring) is very much exceeded by the radius of the bore. One source of difficulty lies in the relatively great expense of fabricating a stiffening member which must be of thickness that affords uniform yieldability over the entire circumferential extent of the seal and which is nevertheless strictly circular and concentrically assembled with respect to the seal material and with respect to the bearing ring which carries the seal structure.

It is, therefore, an object of the invention to provide an improved seal structure avoiding the above-noted difficulties and particularly applicable to antifriction bearings of the relatively large bore proportions indicated.

Another object is to provide seal structure meeting the above object with economy of manufacturing and material cost.

A further object is to provide an improved method of making seals for such bearings.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIG. 1 is a vertical sectional view of a bearing incorporating a seal of the invention;

FIGS. 2, 3 and 4 are similar fragmentary sectional views to illustrate steps in the making of a seal of the invention;

FIG. 5 is a view similar to FIG. 4 to illustrate a modification; and

FIGS. 6 and 7 are enlarged fragmentary sectional views illustrating seal action for the respective forms of FIGS. 4 and 5.

Briefly stated, the invention contemplates a laminated seal construction and method utilizing a flat annular sheet of flexible material, such as elastomeric material, laminated to a backing material, which at an axially thick portion defines a body, and which at an axially thin portion defines a seal member to be axially resiliently deflected with respect to the body. The method of the invention calls for removing backing material after the laminating step, the removed material affording a remainder which meets all requirements as to concentricity, circumferential uniformity of action, and the like. The material-removing step may be so characterized as to provide a local region for axial flexure, radially spaced from the region of wiping contact with the bearing ring to which it is sealingly engaged.

In the drawings, FIG. 1 illustrates an antifriction bearing comprising inner and outer race rings 10–11, with plural balls 12 riding raceways in said rings. Retainer structure is indicated at 13, for angularly spacing the balls 12. The overall radial thickness T of the bearing section is very greatly exceeded by the radius R of the bore of the inner ring 10. A seal structure 14 of the invention includes a body member 15 seated in a counterbore at one axial end of the outer ring 11; the seal structure also includes a seal member 16 having resilient, axially preloaded, wiping and sealing contact with a rabbeted peripheral end surface 17 of the inner ring 10. The seal 14 is shown projecting slightly beyond the axial end of outer ring 11, but this will be understood to allow for tight compression of seal 14 against a mounting shoulder (not shown) when the bearing is installed and in use.

The detailed construction of seal 14 will be better understood from a description of its method of manufacture, illustrated in FIGS. 2 to 4.

The laminated seal blank of FIG. 2 is first selected or prepared. It comprises a flat annulus 20 of flexible material, such as an elastomeric material, bonded in a single radial plane to a relatively thick body 21 of stiff backing material. The inner and outer radial limits of the blank of FIG. 2 may be determined by the mold (not shown) in which the bond and plastic are cured; these limits preferably match the ultimate outside dimensions of the seal structure 14. The backing material may be of metal but is preferably a cured and hardened plastic laminate, such as a fabric-reinforced phenolic, epoxy or the like. Thin vertical hatch lines in the drawing suggest a preference for having the fabric laminations parallel to the bonding plane.

FIG. 3 illustrates the next step wherein backing material is locally removed to define separate seal-member and body-member portions 15–16 of the structure. If the seal structure is to be carried by the inner ring, then the backing material should be removed from the radially outer part of the backing 21; however, in the present form, the seal 14 is carried by the outer ring 11, so that material is shown removed at 22 from the backing 21. In order that the body member 15 may be substantially rigid, the backing material thereof is preferably of substantially greater thickness than the layer of seal-lip material 20; also, to achieve relative flexibility in the seal member 16, the backing material is preferably of substantially lesser thickness than the layer 20. It will be appreciated that for certain applications it may be desired to leave the seal member 16 integral with the body member 15, as shown in FIG. 3.

It is, however, preferred that a region of predominant flexibility be established between the wiping-contact region (i.e., a contact with surface 17) and the body member 15. In FIGS. 4 and 5, this is achieved by further removing backing material 21 at an annular region between the members 15–16. In FIG. 4, all backing material 21 is removed at such a region 23, and in FIG. 5 only the thinnest layer of backing material 21 is left at the corresponding region 24. It will be appreciated that for the FIG. 5 situation, the reinforcing material (e.g., fabric) for at least the lamination adjacent the radial plane of bonding is preferably sufficiently thin to assure uncut fabric material in said lamination at the region 24. And it is also preferred that the seal member 16 shall be of such thickness as to include at least one reinforcing lamination that is substantially unimpaired in the course of removing material at 22.

FIGS. 6 and 7 illustrate the sealing engagement with the rabbeted surface 17, for the respective forms of FIGS. 4 and 5. Resilient axial deflection is seen to be radially localized, at 25–26, respectively, remote from the zone of seal-wiping contact. In FIG. 6, the layer 20 alone provides the flexible connection, and in FIG. 7 the section 24 is so reduced as to be flexible and thus to assist the flexible layer 20.

It will be seen that the invention provides an improved method and seal meeting the stated objectives. No particular machining problems are presented because the removal of material at 23 or 24 is a final operation, meaning that good body support in material 21 exists for all machining up to that point. The resulting installed seal not only exhibits a stiffer axial loading for a given axial deflection, but also has the stiffness to assure an excellent continuous seal for unusually proportioned large-bore bearings; additionally, a hard protective shell is presented to preserve the softer seal layer 20. Moreover, the added stiffness of the seal lip resists seal opening even under the adverse condition of high-pressure impingement of cleaning fluids.

While the invention has been described in detail for the embodiments shown, modifications may be made without departing from the scope of the invention.

What is claimed is:

1. The method of making a bearing seal from a laminated disc-shaped ring having a flat annular disc layer of flexible material bonded in axial adjacency to a relatively thick flat annular disc layer of relatively stiff backing material, both said layers extending between inner and outer radial limits, whereby flexible material defines one axial end of said ring and backing material defines the other axial end of said ring, which method comprises circumferentially removing backing material at said other axial end and in the radial span between one of said radial limits and a location radially intermediate said radial limits, said backing material being substantially but not completely removed in the axial direction of the flexible layer to define a relatively thinly and compliantly backed seal member integral with a relatively thick body member, the removal of backing material being at least to an extent at which said seal member may be angularly flexed with respect to said body member.

2. The method of claim 1, in which said flexible material includes an elastomeric.

3. The method of claim 1, in which solely in the localized region of adjacency to the body member, the backing material is removed to a radial extent substantially coincident with the surface of bonding to the flexible layer.

4. The method of claim 1, wherein the relatively stiff backing material is a cured and hardened, fabric-reinforced, laminated plastic.

References Cited

UNITED STATES PATENTS

| | | | |
|---|---|---|---|
| 1,282,160 | 10/1918 | Young | 156—268 |
| 1,466,086 | 8/1923 | Christenson | 156—268 |
| 2,293,751 | 8/1942 | May | 156—211 |
| 3,488,248 | 1/1970 | Long | 156—268 |

DOUGLAS J. DRUMMOND, Primary Examiner

U.S. Cl. X.R.

156—268